(No Model.)
H. KIMBALL.
DIE FOR THE MANUFACTURE OF TURN BUCKLES.
No. 285,276. Patented Sept. 18, 1883.
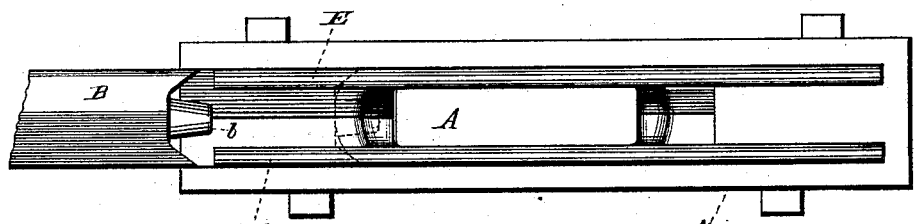
Fig 1
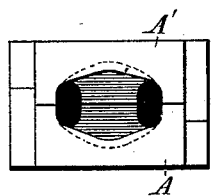   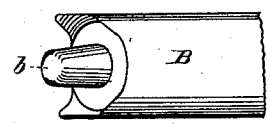   
Fig 2   Fig 3   Fig 3½
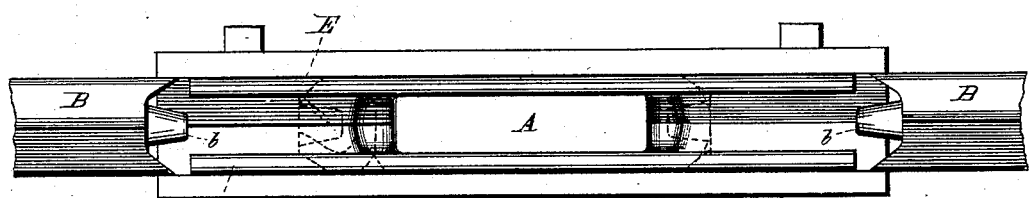
Fig 4
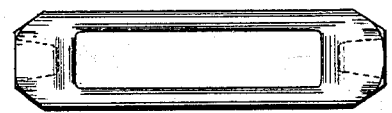
Fig 5
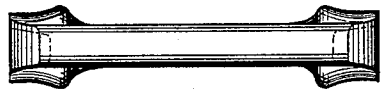
Fig 6
ATTEST
W. Engel
W. E. Donnelly
INVENTOR
Hiram Kimball
By Leggett & Leggett
Attys.
N. PETERS. Photo-Lithographer. Washington. D. C.

UNITED STATES PATENT OFFICE.

HIRAM KIMBALL, OF CLEVELAND, OHIO.

DIE FOR THE MANUFACTURE OF TURN-BUCKLES.

SPECIFICATION forming part of Letters Patent No. 285,276, dated September 18, 1883.

Application filed August 14, 1883. (No model.)

*To all whom it may concern:*

Be it known that I, HIRAM KIMBALL, of Cleveland, in the county of Cuyahoga and State of Ohio, have invented certain new and useful Improvements in Dies for the Manufacture of Turn-Buckles; and I do hereby declare the following to be a full, clear, and exact description of the invention, such as will enable others skilled in the art to which it pertains to make and use the same.

My invention relates particularly to the manufacture of turn-buckles, sometimes called "arm-swivels." Heretofore such turn-buckles have usually been made by welding two pieces of iron for the arms to other pieces to furnish stock for sockets or nuts on the ends. In some cases the stock for the sockets has been obtained by coiling together the ends of two bars of sufficient length to furnish material for the whole buckle, and in either case the sockets forming the ends and uniting the side arms have usually been welded and forged into shape by hand or power hammering, mostly on the sides, or, in other words, by lateral forging. Turn-buckles made by such methods are expensive and unreliable in quality. The welding of the arms and sockets is not always reliable, and a more serious trouble is due to the abrupt union of the bars forming the connecting-arms with the larger and more rigid section of metal forming the sockets. Even with a perfect weld and the metal uninjured, it is well known that there is a weak spot wherever a sharp angle is formed by abruptly uniting larger and smaller sections of metal, and by ordinary methods of forging the weld is liable to be imperfect, and the smaller section of metal is frequently injured by being burned in exposure to heat sufficient for the larger mass, or by internal strains developed in forging as the metal cools. These difficulties occur where there is a single union of the kind forged in the ordinary way, and it will be readily understood that there is a manifold increase of such troubles when, as in turn-buckles, two short bars of iron are united at both ends by comparatively heavy and rigid masses of metal. The common form of turn-buckles and some of the best means heretofore employed in making them are shown in the patents issued to M. Merrill, August 3, 1875, No. 166,286, and to W. Ward, April 11, 1882, No. 256,256.

The object of my invention is the production of reliable turn-buckles at a reduced cost, which I accomplish by the mechanism herein described.

In the drawings, Figure 1 shows an arrangement of dies for forging a turn-buckle one end at a time, and Fig. 4 an arrangement for forging both ends simultaneously, the same letters of reference being used for similar parts in both cases.

A A' are dies for inclosing the metal to be forged, made in two parts, so as to open in the middle, as shown in Fig. 2.

E E are two bars of iron of the section desired for the sides or arms of the turn-buckle, and of length to furnish stock for the whole.

B in Fig. 1 and B B in Fig. 4 are plunger-dies for forcing the metal into the shape to form sockets for the ends of the turn-buckle, the form of the plunger-dies being shown more fully by perspective and end views in Figs. 3 and 3½. Figs. 5 and 6 are views of a turn-buckle forged in such dies.

I do not show frame-work for holding nor mechanism for operating the dies, as they may be of ordinary or well-known forms.

The inclosing-dies A A' require to be so arranged that they may be readily opened and closed, and so that they may be closed quickly and firmly when the metal to be forged is inserted. The dies A A' being open, the bars E E, at a welding heat, are inserted, as shown in Figs. 1 and 4, the dies A A' are firmly closed, and the plungers B in Fig. 1 or B B in Fig. 4 are quickly driven forward into the apertures in the inclosing-dies with sufficient force to weld and forge the ends of the bars into the desired form, as shown by dotted lines in Fig. 1 and the right end of Fig. 4. When straight bars of metal are used, as shown in the drawings, the ends buckle or fold together, somewhat as shown by dotted lines in the left end of Fig. 4.

I prefer to make the plungers B with a punch or point, *b*, projecting in the center, substantially as shown in the drawings, for the purpose of punching a hole partly through the metal forged for sockets. Such a short punch, without preventing the ends of the bars from folding together, somewhat as shown by dotted lines in the left end of Fig. 4, leaves but little metal to be bored out to form the sockets, facilitates forcing the metal into the cavities, and by punching into and partly through the folded ends of the bars so distributes the fibers of the iron around the socket that the strength depends but little on a perfect weld. By this mechanism the metal is pressed into the desired form almost instantly, the work all being done while the metal is at a high heat and in such a ductile condition that it is easily forced into the form of the dies, and the plunger-dies being driven with sufficient force, a reliable weld is insured without the injury to the fibers of the metal liable to occur when the forging is done by repeated blows.

It is obvious that by the use of appropriate dies any desirable form may be given to the forged ends for sockets, an important feature being the facility for so upsetting the connecting-arms where they unite with the sockets, as shown in Fig. 6, as to avoid a sharp angle, and also give a perfect form to the ends.

Instead of using straight bars, as shown, the ends of the bars may be first formed into any shape in which they can be inserted in the dies, as by being twisted or coiled together, or shorter bars may be used and the necessary stock supplied by inserting a separate block between the ends.

Turn-buckles forged by the mechanism described, besides the advantage of more perfect form than those forged in any other way, are more reliable in quality, owing to the work on them being all done while the metal for the sockets is at a high and uniform heat, the metal forged being subjected to great pressure while inclosed, giving it an increased and uniform density, and the fibers of the iron being more advantageously distributed.

I claim—

1. In machinery for forging turn-buckles, the combination with suitable inclosing-dies having cavities for holding two bars for forming connecting-arms, and for forming sockets on one or both ends thereof, with apertures for one or more plunger-dies, of one or more plunger-dies adapted to be driven into such apertures for the purpose of forging sockets on the ends of the connecting-arms, substantially as described.

2. In machinery for forging turn-buckles, the combination, with the holding or inclosing dies A A', of one or more plunger-dies adapted to enter and close an opening in the inclosing-dies, and provided with a projecting punch or center, substantially as and for the purpose set forth.

In testimony whereof I sign this specification, in the presence of two witnesses, this 10th day of August, 1883.

HIRAM KIMBALL.

Witnesses:
   ALBERT E. LYNCH,
   CHAS. H. DORER.